United States Patent [19]

Wiese

[11] 4,346,911
[45] Aug. 31, 1982

[54] HITCH

[76] Inventor: Colin R. Wiese, Fairlight, Milbrulong, New South Wales 2737, Australia

[21] Appl. No.: 181,279

[22] Filed: Aug. 25, 1980

[30] Foreign Application Priority Data

Sep. 17, 1979 [AU] Australia .............................. PE0488
Nov. 22, 1979 [AU] Australia .............................. PE1431

[51] Int. Cl.³ .......................... B60D 1/08; B60D 1/14
[52] U.S. Cl. ................................ 280/478 R; 280/474;
280/475; 280/477; 280/478 B; 280/493
[58] Field of Search .............. 280/477, 478 R, 478 B,
280/474, 475, 491 D, 492, 493, 494, 421

[56] References Cited

U.S. PATENT DOCUMENTS 3,388,927 6/1968 von Grunberg et al. ........... 280/421
3,981,517 9/1976 Crochet, Sr. .................... 280/478 R
4,077,234 3/1978 Crochet, Sr. .................... 280/478 R
4,131,295 12/1978 Highberger ......................... 280/475

Primary Examiner—Joseph F. Peters, Jr.
Assistant Examiner—Donn Mc Giehan
Attorney, Agent, or Firm—Ladas & Parry

[57] ABSTRACT

A hitch for connecting a prime mover such as a tractor to an implement such as a plough to be drawn by the prime mover. The hitch comprises a two part prime mover drawbar and a separate single part implement drawbar. One part of the prime mover drawbar is connectable to the prime mover, the other part carries a spring loaded first latch, the implement drawbar carries a second latch, the first and second latches being arranged to secure the prime mover drawbar and the implement drawbar.

10 Claims, 7 Drawing Figures

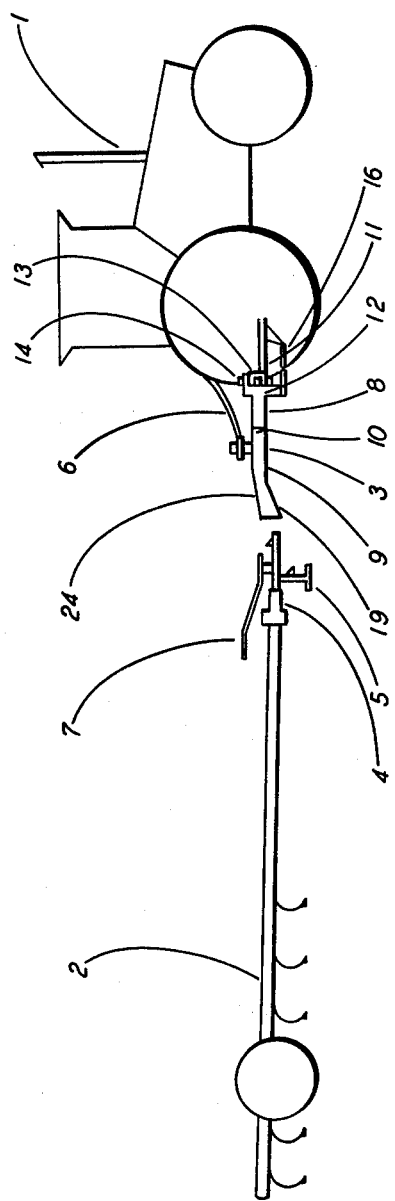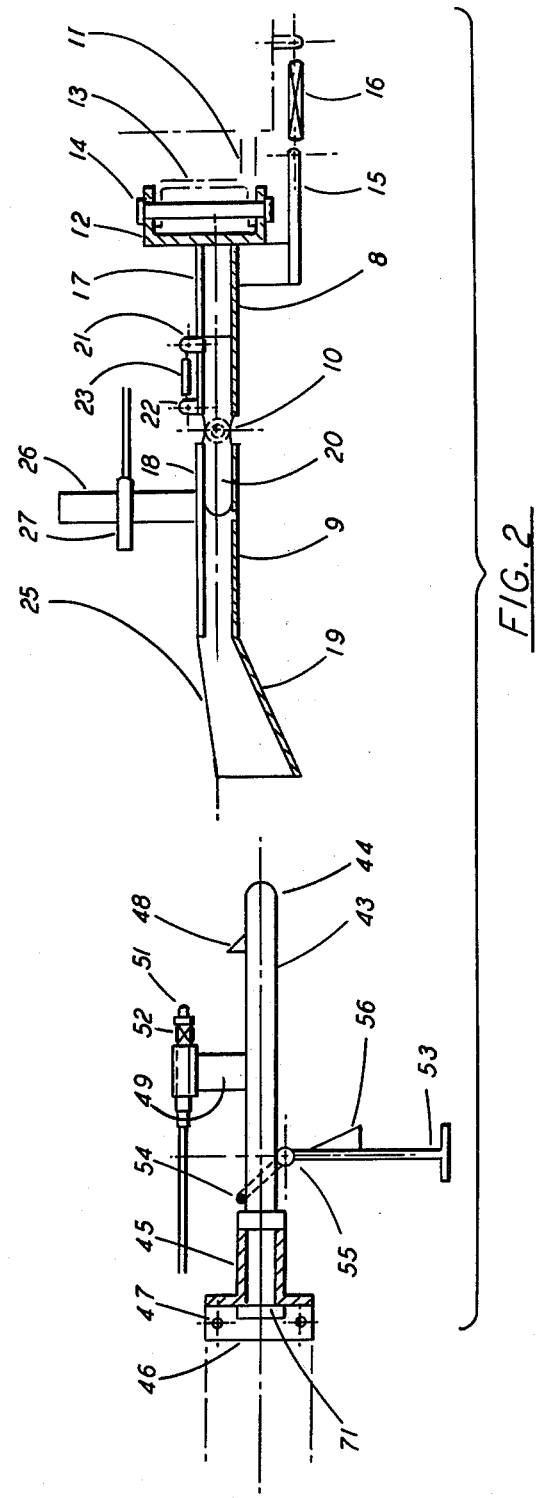

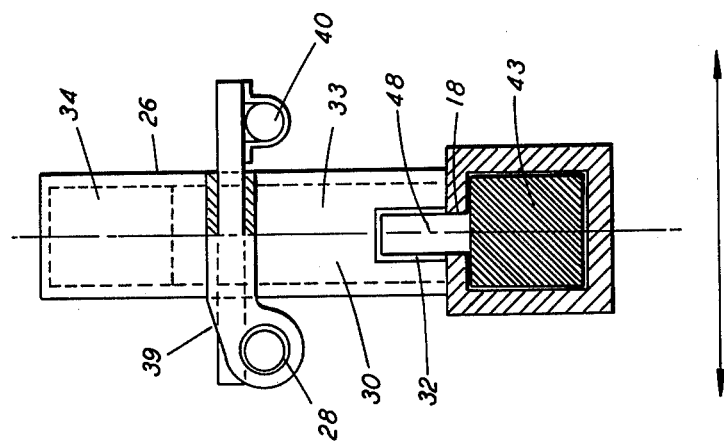
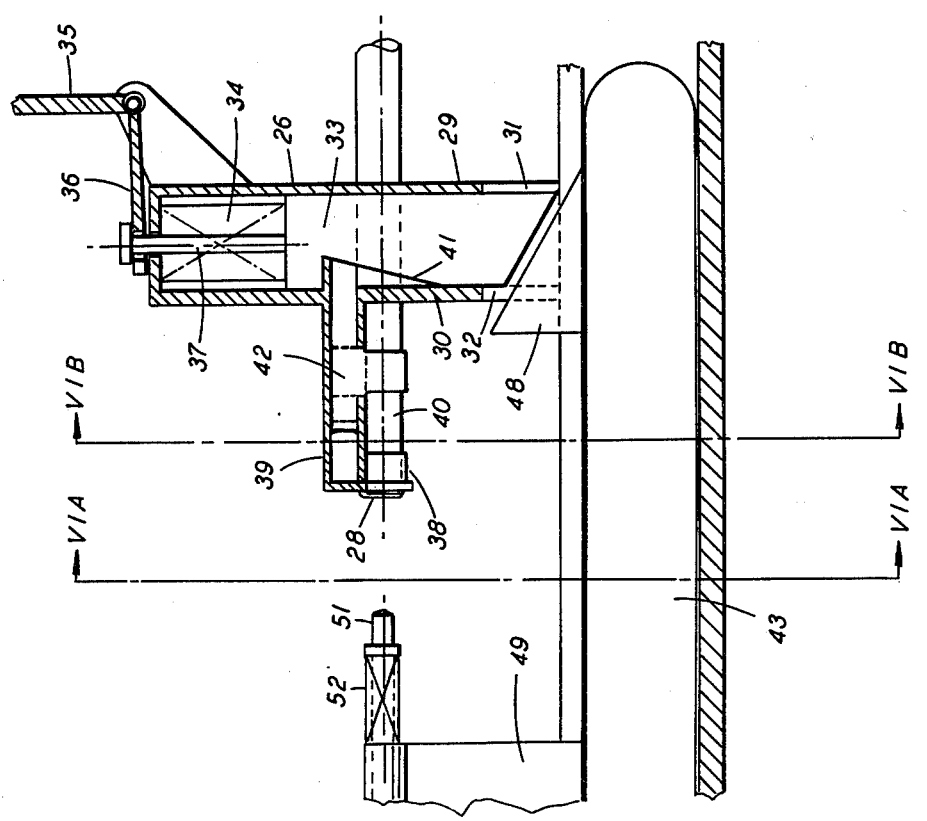

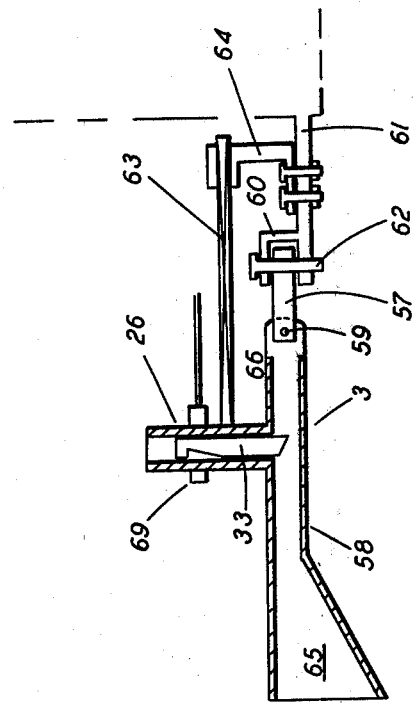
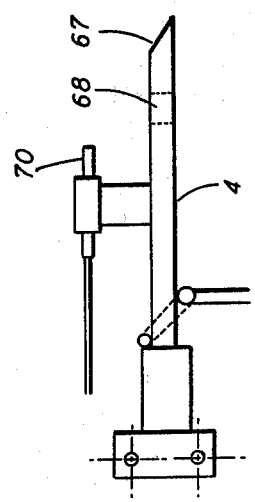
FIG. 7

HITCH

This invention relates to a hitch for use in connecting or joining a prime mover such as a tractor, truck, motor vehicle, airport tractor and the like, to an implement to be drawn by or moved by the prime mover.

The object of the invention is to provide a hitch which, when connected to a prime mover on the one hand and to an implement to be moved on the other, will enable the prime mover to be joined to the implement without any need for the driver to descend from the prime mover. If hydraulic couplings are provided between the prime mover and the implement then the invention also provides for the couplings to be made at the same time as the hitch components are coupled. The hydraulic coupling means may be used separately.

According to this invention a hitch comprises a two-part drawbar, namely a prime mover drawbar and an implement drawbar, said prime mover drawbar itself being in two parts pivoted together about a horizontal axis, each of the two parts of the prime mover drawbar being substantially of box section over the ajoining lengths of the two parts, a slide movable longitudinally along the prime mover drawbar and being spring loaded in such manner that it engages inside both parts of the prime mover drawbar, thereby to prevent rotation about the said horizontal axis, a first part of the prime mover drawbar being connectable to the prime mover in normal manner, the second part of the prime mover drawbar carrying a spring loaded latch member and, rearwardly of the latch member, having a part which is three-sided of which the sides flare outwardly and the base flares downwardly and rearwardly to form a ramp, said implement drawbar carrying at or near its end remote from the implement a second latch member which cooperates with the latch member on the prime mover drawbar, the said remote end being guided by the ramp and flared sides to engage within the box section of the second part of the prime mover drawbar and slide along it during engagement of the two parts of the hitch, the said remote end during this sliding motion abutting against the end of the slide and displacing it until it is wholly engaged within the said first part of the prime mover drawbar whereby the two parts are freed to rotate about the said horizontal axis, the two latch members being then engaged, a stand pivoted to the implement drawbar which stand is engaged by the ramp end during engagement of the two parts of the hitch and is rotated toward the horizontal and is held in that position when the two parts of the hitch are fully engaged, at least one female hydraulic coupling supported on the prime mover drawbar, said coupling being of the type having an outer shell and an internal member displaceable relative to each other to allow a male hydraulic coupling to be accepted and held, means for securing the outer shell to the prime mover drawbar, a housing for a vertical plunger, a plunger within said housing, a spring holding said plunger in its lowermost position, an inclined surface on the plunger, means secured to said internal member and displaceable by the inclined surface, a wedge or cam surface on the implement drawbar which raises the plunger as the parts engage thereby to displace the said internal member to allow a male hydraulic coupling to be received, which plunger is returned to its original position by the last mentioned spring as the engagement is completed, at least one male hydraulic coupling supported on the implement drawbar which engages with the female hydraulic coupling, and means to raise the plunger when the parts are to be disengaged.

Also according to the invention a hitch comprises a two-part drawbar, namely a prime mover drawbar and an implement drawbar, said prime mover drawbar itself being in two parts pivoted together about a horizontal axis, means for holding the two parts of the prime mover drawbar substantially in line at least while the two parts of the hitch are being joined, a first part of the prime mover drawbar being connected to the prime mover in normal manner, the second part thereof carrying a spring loaded latch member and, rearwardly of the latch member, a downwardly and rearwardly extending ramp, said implement drawbar carrying at or near its end remote from the implement a second latch member for engaging with the latch member on the prime mover drawbar, the said remote end being guided by the ramp to engage with and slide along the second part of the prime mover drawbar until the two latch members engage when the two parts of the hitch are brought together.

Also according to this invention a hitch comprises a two-part drawbar, namely a prime mover drawbar and an implement drawbar, means for latching the two parts of the drawbar together, at least one female hydraulic coupling supported on the prime mover drawbar, an outer shell for the coupling, an internal member for the coupling, the internal member and outer shell being displaceable relative to each other to allow a male hydraulic coupling to be accepted and held, means for securing the outer shell to the prime mover drawbar, a housing on the prime mover drawbar for a vertical plunger within said housing, a spring holding said plunger in its lowermost position, an inclined surface on said plunger, means secured to the said internal member and displaceable by the inclined surface, a wedge or cam surface on the implement drawbar which raises the plunger as the parts engage thereby to displace the said internal member to allow a male hydraulic coupling to be received, which plunger is returned to its original position by the spring as the engagement is completed, at least one hydraulic coupling on the implement drawbar which engages with the female hydraulic coupling, and means to raise the plunger when the parts are to be engaged.

The invention will now be described further with reference to the accompanying drawings which show a hitch used for joining a tractor to farm machinery to be drawn by the tractor, and which is provided with hydraulic couplings between a hydraulic motor driven by the tractor engine and hydraulic rams and the like on the farm machinery by which various operations can be carried out.

In the drawings:

FIG. 1 is a generalised or outline drawing of a tractor and a farm implement employing the hitch of the invention with the two parts of the hitch not joined;

FIG. 2 is a side view of the hitch before joining, partly in section;

FIG. 5 is an enlarged part sectional side view of the engaging parts of the hitch, just before the hitch is fully engaged;

FIG. 6 is a frontal section in which the left-hand side of the drawing is taken along the second line VIA—VIA and the right-hand side along the section line VIB—VIB; and FIG. 7 is a side view of a modified form of the hitch.

Referring now to FIG. 1 a tractor is shown in outline at 1 and a farm implement at 2. The tractor and implement are adapted to be joined by a hitch of which one part, indicated generally by the numeral 3, is attached to the tractor (herein sometimes called the "tractor drawbar" or "prime mover drawbar"). The other or second part of the hitch is indicated generally at 4 and is connected to the farm implement (and is herein sometimes called the "implement drawbar"). When the two parts of the hitch are not joined, as shown in this Figure, the implement drawbar is supported on a stand 5 pivoted to the implement drawbar 4. The end of the implement drawbar nearest the tractor drawbar is below the level of the centre line of the tractor drawbar 3 by, say, 5 to 7 cm. The hydraulic couplings and lines are shown at 6 and 7.

Figure 4:
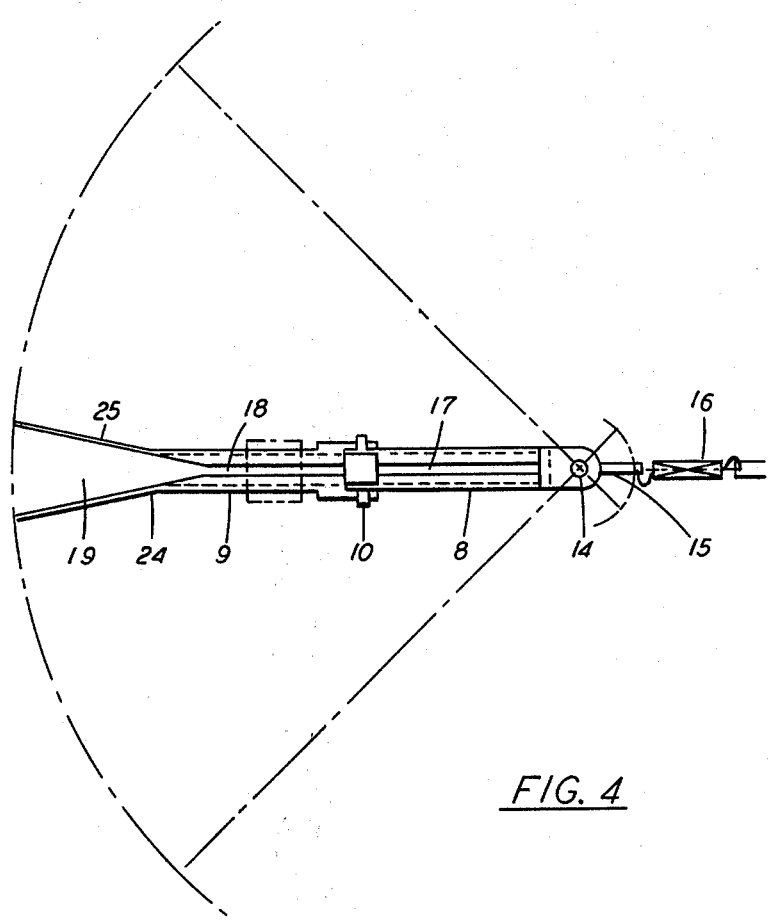
FIG. 4 is a plan view of the part of the hitch connected to the tractor.

The tractor drawbar 3 comprises two parts 8, 9 (see also FIGS. 2 to 4) pivoted together at their adjacent ends by pin 10 about a horizontal axis at right angles to the length of the tractor drawbar. The tractor end 8 is provided with any suitable means for connection to the towbar 11 provided on the tractor, which means allow the tractor drawbar 3 to rotate in the horizontal plane. As shown it is a simple U-piece 12 engaging around a smaller U-piece 13 on the tractor towbar held together by a vertical pin 14, as is common practice. The tractor drawbar 3 is provided with spring means which tend to hold the drawbar in line with the longitudinal axis of the tractor. For example the tractor drawbar 3 can be provided with an extension 15 beyond and below the pivot 14 the end of which is connected to a point on the tractor towbar 11 by a spring 16.

In section the tractor drawbar parts 8, 9 are of boxshape with longitudinal slots 17, 18 (see particularly FIGS. 4 and 6) except at their ends which are shaped to provide the pivots 10, 12, 13 and 14, and the ramp 19. A slide 20 is positioned in the channel of the first part 8 of the tractor drawbar and has a vertical projection 21 at the tractor end extending through the slot 17. The projection 21 is connected to a suitable fixed projection 22 on the tractor drawbar by an extension spring 23 which tends to hold the slide in the position shown in FIG. 2 with the slide being partly within both the first and second parts 8, 9 of the tractor drawbar holding the two parts in line and preventing any substantial rotation about the pivot 10. The length of the slide is such, however, that it can be displaced to the position shown in FIG. 3, with the spring 23 extended, such that the second part 9 of the tractor drawbar is free to pivot about 10. (In the interest of clarity the parts 21, 22, 23, have not been shown in FIG. 4.)

The end of the second part 9 of the tractor drawbar which is furthest from the tractor (the rear end of this part) is of a three-sided funnel shape having a lower surface forming a ramp 19 and vertical sides 24, 25 which provide guides in the horizontal plane.

A vertical box-section member (not shown in FIG. 4) 26, is welded to the top of the second part 9 of the tractor drawbar and serves the dual purpose of a latch for the part of the hitch 4 secured to the farm implement and a support for the pair of female hydraulic couplings 27, 28 (only one of which 28 is shown in FIGS. 5 and 6). The front and rear surfaces 29, 30 of the member 26 are slotted 31, 32 at their lower ends above the slot in the part 9 for a purpose to be described (see FIGS. 5 and 6). A plunger 33, inside the latch casing 26 is normally held in the position shown in FIG. 5 by the compression spring 34, but can be lifted from that position by compressing the spring by means of the linkage 35, 36, 37 which is under control, by any suitable means, by the driver of the tractor. Each female hydraulic coupling is of a known commonplace type having a fixed outer shell 38, which is secured to the extension piece 39, welded to the latch casing or support member 26, and an internal member attached to the hydraulic hose 40, which is advanced with the hose when the male member 41 on the other hydraulic coupling, is to be accepted. The hose 40, and the said internal member are advanced during coupling by means of the inclined plane surface 41, on the rear face of the plunger 33, when the plunger is raised. The inclined plane 41 bears against a plunger 42, which is secured to the hydraulic hose.

The machinery or implement drawbar comprises a bar 43 having a rounded end 44. The bar 43 is secured at its rear end to the implement by means of a coupling which allows limited rotation of the machinery relative to the drawbar to allow for uneven ground. For this purpose the bar 43, or at least its rear end 45 is cylindrical and is free to rotate within a bore in the housing 46. The housing is secured to the implement by bolts 47. The rear of the end 45 is formed as a head 71. The forward end of the bar 43 is of such section as to slide easily within the box section of the tractor drawbar part 9. Near its front end on its upper surface it carries a wedge-shaped latch member 48. The width of the latch member 48 is such that it can slide easily in the slot 18. A vertical frame 49, welded to the bar 43 intermediate its ends carries a pair of male hydraulic couplings 50, 51 which are urged towards the front of the implement by springs 52. A bell-cranked lever having one arm formed as a stand 53, and the other arm 54, enclosing the bar 33, is pivoted at 55, to the underside of the bar 43. The arm 54 limits the movement of the stand 53. A wedge is secured to the forward face of the stand 53.

Figure 3:
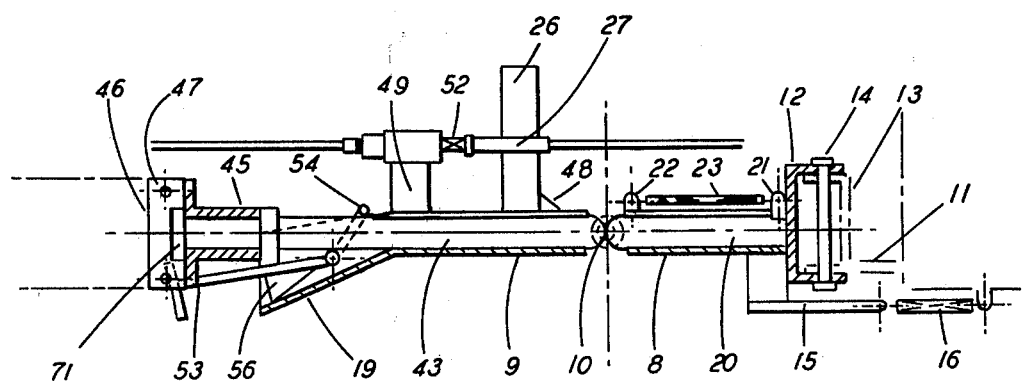
FIG. 3 is a similar view to FIG. 2 after the two parts of the hitch have been joined.

To couple the two parts of the hitch together the tractor 1 is backed up to the implement 2 with the tractor and machinery drawbars 3,4 substantially in line. As mentioned previously the stand 53 is of such height that the end of the implement drawbar 4, adjacent to the tractor drawbar is about 5 cm below the adjacent end of the tractor drawbar as is best seen in FIG. 1. The tractor is backed still further and the round end of the bar 43 engages in the guide funnel 19, 24, 25 and rides up the ramp 19, lifting the stand free of the ground. The sides 24, 25 allow for small errors sideways. The bar 43 slides along the box-section of the part 9, the tractor continues to back until the rounded end of bar 43 abuts against the rounded end of the slide. Further backing causes the bar 43 to push the slide back until the position shown in FIG. 3 is reached. Toward the end of this backing the position shown in FIGS. 5 and 6 is reached and passed. In the position shown in FIG. 5 the wedge 48 is about to engage with the inclined lower face of the plunger 33. As the tractor backs from the position shown in FIG. 5 the wedge raises the plunger 33 and the inclined plane 41 forces the plunger 42 rearwardly causing relative movement of the two parts of the female hydraulic couplings permitting these couplings to accept the male couplings 51. Finally the wedge passes the end of the plunger 33 which is forced down by the spring 34, and this (a) causes the rear vertical face of the wedge 48 to latch in front of the plunger 33, and (b) permits the two parts of the female hydraulic couplings to spring back to their original positions and thus locking onto the male couplings.

During the actions just described the end of the ramp 19 comes against the wedge 56 and causes the stand 53 to rotate about the pivot 5 to the raised position shown in FIG. 3. The hitch is now completed.

To release the hitch the driver operates the linkage which raises the plunger 33 and at the same time drives the tractor forward. The plunger releases the wedge-shaped latch member 48, and at the same time produces relative motion between the two parts of the female hydraulic couplings enabling both the bar 43 and the male hydraulic couplings to be withdrawn. The slide 20 moves rearwardly and holds the two parts 8, 9 of the tractor drawbar in a straight line. As the parts separate the stand 53 returns to the vertical position either by its own weight or by springs (not shown).

FIG. 7 shows the two parts of a modified form of hitch separated from each other. Only those parts necessary to permit an understanding of the modification are shown. For example, details of the stand have not been shown.

As in the previous embodiment the tractor drawbar 3 is made in two parts 57, 58 pivoted together about a horizontal axis by pivot 59. In this embodiment the part 57 connected to the tractor is comparatively short but, as in the previous embodiment is connected to the tractor by means which allow rotation in the horizontal plane. The means shown is conventional, the end of the part 57 being enclosed by a forked end 60 to the tractor towbar 61 and the parts 57, 60 pivoted together by a vertical pin 62. The two parts 57, 58 of the drawbar 3 are held substantially in a horizontal plane by a spring 63 connected between an upright 64 bolted to the tractor towbar and an upright 26 which also doubles as the latch casing. The latch casing contains the plunger 33, as in the previous embodiment, which forms one part of the latch. The lower end of the plunger is cut away from the rear face at about 45° to form a sloping face.

The second part 58 of the tractor drawbar is longer than the first part and is of box-section between the flared end 65 and the pivot end 66. The flared end 65 is of channel section as in the previous embodiment having flared vertical members and a flared base forming the ramp 19.

The implement drawbar 4 may be solid or of box-section and is of such size and shape as to be freely slidable within the central box-section part of the tractor drawbar. Its free end is provided with a sloping face 67 which, when the parts are being joined, abuts against the sloping face on the plunger 33 and forces it upwardly. A rectangular slot 68 is provided in the implement drawbar and, when the parts are joined the lower end of the plunger 33 drops into the slot.

As in the previous embodiment a mechanical or hydraulic linkage under the control of the tractor driver is provided to release the latch formed by 33 and 68.

Hydraulics are shown at 69, 70 and may be of the same type as shown in the first embodiment. Alternatively they may be of a type which can be engaged merely by forcing together.

What I claim is:

1. A hitch comprising a two-part drawbar, namely a prime mover drawbar and an implement drawbar, said prime mover drawbar itself being in two parts pivoted together about a horizontal axis, each of the two parts of the prime mover drawbar being substantially of box-section over the adjoining lengths of the two parts, a slide movable longitudinally along the prime mover drawbar and being spring loaded in such manner that it engages inside both parts of the prime mover drawbar thereby to prevent rotation about the said horizontal axis, a first part of the prime mover drawbar being connectable to the prime mover in normal manner, the second part of the prime mover drawbar carrying a spring loaded latch member and rearwardly of the latch member, having a part which is three-sided of which the sides flare outwardly and the base flares downwardly and rearwardly to form a ramp, said implement drawbar carrying at or near its end remote from the implement a second latch member which cooperates with the latch member on the prime mover drawbar, the said remote end being guided by the ramp and flared sides to engage within the box section of the second part of the prime mover drawbar and slide along it during engagement of the two parts of the hitch, the said remote end during this sliding motion abutting against the end of the slide and displacing it until it is wholly engaged within the said first part of the prime mover drawbar whereby the two parts are freed to rotate about the said horizontal axis, the two latch members being then engaged, a stand pivoted to the implement drawbar which stand is engaged by the ramp end during engagement of the two parts of the hitch and is rotated by the said ramp end toward the horizontal and is held in that position when the two parts of the hitch are fully engaged, at least one female hydraulic coupling supported on the prime mover drawbar, said coupling being of the type having an outer shell and an internal member displaceable relative to each other to allow a male hydraulic coupling to be accepted and held, means for securing the outer shell to the prime mover drawbar, a housing on the prime mover drawbar for a vertical plunger, a plunger within said housing, a spring holding said plunger in its lowermost position, an inclined surface on said plunger, means secured to the said internal member and displaceable by the inclined surface, a wedge or cam surface on the implement drawbar which raises the plunger as the parts engage thereby to displace the said internal member to allow a male hydraulic coupling to be received, which plunger is returned to its original position by the last-mentioned spring as the engagement is completed, at least one male hydraulic coupling supported on the implement drawbar which engages with the female hydraulic coupling, and means to raise the plunger when the parts are to be disengaged.

2. A hitch as claimed in claim 1, wherein the said plunger forms part of the said spring loaded latch member on the prime mover drawbar.

3. A hitch comprising a two-part drawbar, namely a prime mover drawbar and an implement drawbar, means for latching the two parts of the drawbar together, at least one female hydraulic coupling supported on the prime mover drawbar, an outer shell for the coupling, an internal member for the coupling, the internal member and outer shell being displaceable relative to each other to allow a male hydraulic coupling to be accepted and held, means for securing the outer shell to the prime mover drawbar, a housing on the prime mover drawbar for a vertical plunger, a plunger within said housing, a spring holding said plunger in its lowermost position, an inclined surface on said plunger, means secured to the said internal member and displaceable by the inclined surface, a wedge or cam surface on the implement drawbar which raises the plunger as the parts engage thereby to displace the said internal member to allow a male hydraulic coupling to be received, which plunger is returned to its original position by the spring as the engagement is completed, at least one male hydraulic coupling on the implement drawbar which engages with the female hydraulic coupling, and means to raise the plunger when the parts are to be disengaged.

4. A hitch comprising a prime mover drawbar, an implement drawbar, a first part of the prime mover drawbar connectable to a prime mover in normal manner, a second part of the prime mover drawbar, a pivot having a horizontal axis between the said first and second parts of the prime mover drawbar, means for holding the said first and second parts substantially in line while the implement drawbar is being joined to the prime mover drawbar, a spring loaded latch member on the second part of the prime mover drawbar, a downwardly and rearwardly extending ramp at the rear end of the second part, a second latch member on the implement drawbar at or near its end remote from the implement adapted to engage with the said spring loaded latch member when the implement drawbar is fully engaged with the prime mover drawbar, the ramp guiding the said remote end of the implement drawbar to engage with and slide along the second part of the prime mover drawbar until the spring loaded latch member and second latch member engage when the prime mover drawbar and implement drawbar are brought together, and means on the implement drawbar for freeing the two parts of the prime mover drawbar to allow rotation about the said horizontal axis when the prime mover drawbar and implement drawbar are fully engaged.

5. A hitch comprising a prime mover drawbar, an implement drawbar, a first part of the prime mover drawbar connectable to a prime mover in normal manner, a second part of the prime mover drawbar, a pivot having a horizontal axis between the said first and second parts of the prime mover drawbar, a slide movable longitudinally along the prime mover drawbar, spring means displacing the slide to engage with both the first and second parts of the prime mover drawbar whereby relative rotation of the two parts about the said horizontal axis is prevented, a spring loaded latch member on the second part of the prime mover drawbar, a downwardly and rearwardly extending ramp at the rear end of the second part of the prime mover drawbar, a second latch member on the implement drawbar at or near its end remote from the implement adapted to engage with the said spring loaded latch member when the implement drawbar is fully engaged with the prime mover drawbar, means including the ramp for guiding the said remote end of the implement drawbar to engage with and slide along the said second part of the prime mover drawbar until the spring loaded latch member and the second latch member engage when the prime mover drawbar and the implement drawbar are fully brought together, and means on the implement drawbar which displaces the slide against the spring loading during engagement of the hitch parts until the slide is wholly contained within the first part of the prime mover drawbar whereby the two parts of the prime mover drawbar are freed for rotation about the said horizontal axis.

6. A hitch comprising a two-part drawbar, namely a prime mover drawbar and an implement drawbar, said prime mover drawbar itself being in two parts pivoted together about a horizontal axis, a slide movable longitudinally along the prime mover drawbar and being spring loaded in such manner as to hold the two parts of the prime mover drawbar in line so as to prevent rotation about the said horizontal axis, a first part of the prime mover drawbar being connectable to the prime mover in normal manner, the second part of the prime mover drawbar carrying a spring loaded latch member and, rearwardly of the latch member, a downwardly and rearwardly extending ramp, said implement drawbar carrying at or near its end remote from the implement a second latch member for engaging with the latch member on the prime mover drawbar, the said remote end being guided by the ramp to engage with and slide along the second part of the prime mover drawbar to thereby displace the slide during engagement of the hitch parts against the spring loading, whereby at complete engagement of the hitch the slide frees the two parts of the prime mover drawbar for rotation about the horizontal axis, and the two latch members engage.

7. A hitch as claimed in claim 6, wherein the two parts of the prime mover drawbar are substantially of box-section over the adjoining lengths of the two parts, the slide is rectangular in section and slides within the two parts, and the implement drawbar is rectangular in section and slidable within the box-section of the part including the ramp.

8. A hitch as claimed in claim 6, comprising at least one female hydraulic coupling supported on the prime mover drawbar, said coupling being of the type having an outer shell and an internal member displaceable relative to each other to allow a male hydraulic coupling to be accepted and held, each said outer shell being secured to the prime mover drawbar, at least one male hydraulic coupling supported on the implement drawbar, a plunger on the prime mover drawbar having an inclined surface, a wedge or cam surface on the implement drawbar which displaces the plunger as the parts engage to thereby displace the said internal member of the female hydraulic coupling, said plunger and internal member returning to their original position when engagement is complete.

9. A hitch as claimed in claim 8, wherein the plunger is spring urged to the position where the two parts of the female hydraulic coupling are not open to accept the male coupling, and means coupled to the tractor to move the female hydraulic coupling to the position where it will release a male coupling held by it.

10. A hitch as claimed in claim 9, wherein the said plunger forms part of the said spring loaded latch member on the prime mover drawbar.

* * * * *